(12) United States Patent
Menditto

(10) Patent No.: US 9,209,982 B2
(45) Date of Patent: Dec. 8, 2015

(54) CHARGING FOR NETWORK SERVICES BASED ON DELIVERED QUALITY OF SERVICE

(75) Inventor: Louis Menditto, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 1872 days.

(21) Appl. No.: 11/750,975

(22) Filed: May 18, 2007

(65) Prior Publication Data

US 2008/0285475 A1 Nov. 20, 2008

(51) Int. Cl.
| G06F 11/00 | (2006.01) |
| G06F 17/00 | (2006.01) |
| H04L 12/14 | (2006.01) |
| G06Q 30/02 | (2012.01) |
| H04M 15/00 | (2006.01) |
| H04L 12/24 | (2006.01) |
| H04L 12/26 | (2006.01) |

(52) U.S. Cl.
CPC ............ *H04L 12/14* (2013.01); *G06Q 30/0283* (2013.01); *H04L 12/1485* (2013.01); *H04M 15/80* (2013.01); *H04M 15/8016* (2013.01); *H04L 41/5009* (2013.01); *H04L 43/026* (2013.01); *H04M 2215/74* (2013.01); *H04M 2215/7414* (2013.01)

(58) Field of Classification Search
CPC ............................ H04L 12/14; H04L 12/1414
USPC ................................... 370/352; 705/400, 412
See application file for complete search history.

(56) References Cited

U.S. PATENT DOCUMENTS

| 6,512,761 | B1 * | 1/2003 | Schuster et al. | ............... 370/352 |
| 7,209,560 | B1 * | 4/2007 | Fairman et al. | ............... 380/255 |
| 2001/0027449 | A1 * | 10/2001 | Wright | ......................... 705/412 |
| 2001/0033581 | A1 * | 10/2001 | Kawarai et al. | ............... 370/468 |
| 2002/0152319 | A1 * | 10/2002 | Amin et al. | ................... 709/232 |
| 2002/0188732 | A1 * | 12/2002 | Buckman et al. | ............. 709/228 |
| 2002/0198850 | A1 * | 12/2002 | Grande et al. | ................. 705/400 |
| 2004/0143523 | A1 * | 7/2004 | Pegaz-Paquet et al. | ......... 705/34 |
| 2005/0065879 | A1 * | 3/2005 | Birch et al. | ..................... 705/40 |
| 2005/0152378 | A1 * | 7/2005 | Bango et al. | .................. 370/400 |
| 2005/0203835 | A1 * | 9/2005 | Nhaissi et al. | .................. 705/39 |
| 2005/0286488 | A1 * | 12/2005 | Briscoe et al. | ................ 370/351 |
| 2008/0101354 | A1 * | 5/2008 | Arndt | ............................ 370/389 |
| 2009/0271512 | A1 * | 10/2009 | Jorgensen | ...................... 709/224 |

OTHER PUBLICATIONS

Cisco Systems, Inc., Subscriber Control and Billing with the Cisco Content Services Gateway, /warp/public/cc/pd/witc/csvcgtwy/prodlit/iscon_wp.pdf, Jan. 1, 2003, p. 15, Publisher: Cisco Systems, Inc. www.cisco.com, Published in: San Jose, CA, Internet.

* cited by examiner

*Primary Examiner* — Luat Phung
(74) *Attorney, Agent, or Firm* — Patent Capital Group

(57) ABSTRACT

In one embodiment, a method includes receiving quality if service difference data. Quality of service difference data indicates how a particular flow of data packets between a first end node of a particular subscriber and a different second end node differs from a particular quality of service level. The particular quality of service level is one of multiple quality of service levels available over the network. Quality of service data based on the quality of service difference data is sent to billing server that charges the particular subscriber based on the quality of service data.

19 Claims, 4 Drawing Sheets

CHARGING FOR NETWORK SERVICES BASED ON DELIVERED QUALITY OF SERVICE

BACKGROUND OF THE INVENTION

1. Field of the Invention

The present invention relates to billing a subscriber for content delivered over a network.

2. Description of the Related Art

Networks of general purpose computer systems and specialized devices connected by external communication links are well known and widely used in commerce. The networks often include one or more network devices that facilitate the passage of information between the computer systems and devices. A network node is a network device or computer or specialized device connected by the communication links. An end node is a network node that is configured to originate or terminate communications over the network. An intermediate network node facilitates the passage of data between end nodes.

Subscribers obtain access to a packet-switched network (PSN) of an Internet Service Provider (ISP) through a network access gateway. The network access gateway determines whether an entity attempting access is in fact a subscriber authorized to access the network by exchanging packets with an Authentication, Authorization, and Accounting (AAA) server.

A modern ISP can offer different services to different subscribers. To deliver these special services, service gateways are included in the ISP packet switched networks. Service gateways are processes that operate on intermediate network nodes between the source and the destination of data packets. The service gateways read data from a payload of a data packet to provide the networking service. Example services include payload translation and other changes to the contents of a payload, as well as special billing, rating, filtering services, network quality of service and other services that do not modify the contents of a payload. Network quality of service refers to techniques for providing different treatment for different flows of data packets between a subscriber's end node and a remote end node reached through the ISP's network. Rather than forwarding all packets of all flows with the same best effort, some flows receive preferential treatment in terms of more bandwidth, guaranteed minimum bandwidth, shorter delays, less variability in arrival time (such variability is called jitter) or less noise, or other benefits, alone or in some combination.

An intermediate network node that provides network quality of service keeps statistics used for allocating forwarding resources for various flows. Currently, billing does not reflect whether a subscriber's data flows receive treatment that matches the network quality of service for which the subscriber has contracted.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
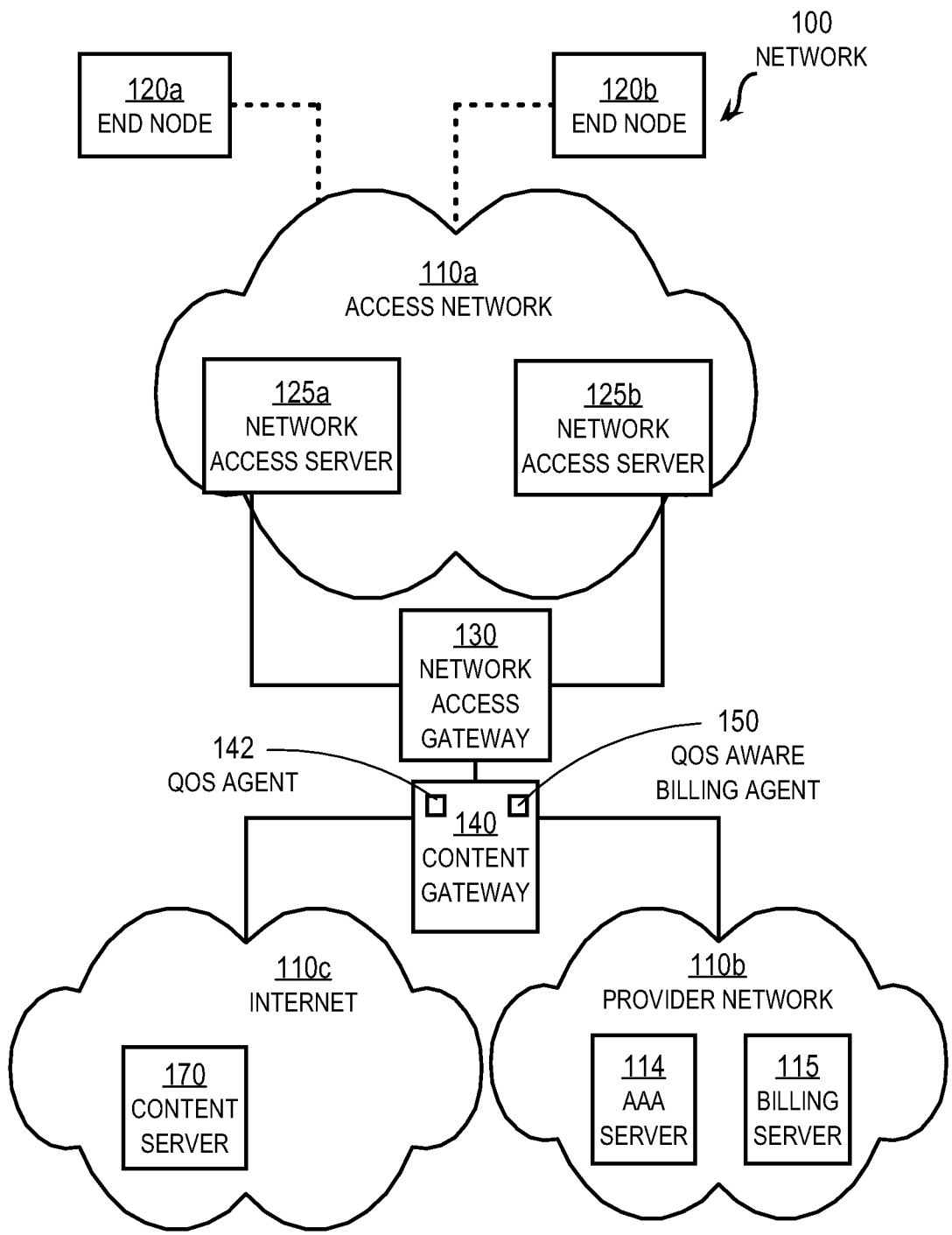
FIG. 1 illustrates an example network with a billing server.

Techniques are described for charging for network services based on a delivered quality of service. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Applicants noticed that, currently, subscriber whose data flows are forwarded, but not at the contracted rate, receives no discount in charges. Similarly, a subscriber, whose data flows entail more than the contracted rate, receives no automatic increment in charges or is denied the higher quality of service. Applicants believe that subscriber satisfaction can be diminished if it is perceived that a reduced quality of service is delivered without appropriate discounts in charges, or that enhanced quality of service is denied when needed, or delivered to others who do not pay a premium for the additional benefit.

In the following description, particular embodiments are described in the context of a content services gateway (CSG) between a radio access network (RAN) and the public Internet. However, the invention is not limited to this context; but can be practiced at any intermediate network node between a subscriber's end node and a network for which the subscriber contracts for a particular level among multiple levels of network quality of service. For example, in some embodiments, the intermediate network node is a proxy for a billing server and an AAA server and all content servers.

1.0 Overview

In one set of embodiments, a method includes receiving quality if service difference data. Quality of service difference data indicates how a particular flow of data packets between a first end node of a particular subscriber and a different second end node differs from a particular quality of service level associated. The particular quality of service level is one of multiple quality of service levels available over the network. Quality of service data based on the quality of service difference data is sent to a billing server that is configured to charge the particular subscriber, at least in part, based on the quality of service data.

In other sets of embodiments, an apparatus, system or computer software is configured to perform one or more steps of the above method.

2.0 Network Overview

Communications between network nodes are typically effected by exchanging discrete packets of data. Information is exchanged within data packets according to one or more of many well known, new or still developing protocols. In this context, a protocol consists of a set of rules defining how the nodes interact with each other based on information sent over the communication links. Each packet typically comprises 1] header information associated with a particular protocol, and 2] payload information that follows the header information and contains information that may be processed independently of that particular protocol. The header includes information used by the protocol, such as the source of the packet, its destination, the length of the payload, and other properties, depending on the protocol. Often, the data in the payload for the particular protocol includes a header and payload for a different protocol associated with a different layer of detail for information exchange. The header for a particular protocol typically indicates a type for the next protocol contained in its payload. The usually higher layer protocol in the payload is said to be encapsulated in the lower layer protocol in the header.

The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

The data-link header provides information defining a particular communication link between one network node and an adjacent node. The internetwork header provides information defining the source and destination address within the computer network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the end node assigned to the destination IP address stored in the packet's internetwork header. After each hop, the source or destination addresses in the packet's data-link header may be updated, as necessary. However, the source and destination IP addresses typically remain unchanged as the packet is transferred from link to link in the network. The IP payload often includes data for an application (layer 7 header and payload).

Routers and switches are intermediate network nodes that determine which communication link or links to employ to support the progress of data packets through the network. An intermediate network node that determines which links to employ based on information in the internetwork header (layer 3) is called a router.

The client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple servers on multiple hosts (sometimes called tiers) for reasons that include reliability, scalability, and redundancy, but not limited to those reasons.

FIG. 1 illustrates an example network 100 with a billing server 115. The network 100 includes an access network 110a, a provider network 110b and an Internet 110c. The access network 110a is connected to the provider network 110b and Internet 110c through a network access gateway 130 and content gateway 140. End node 120a and end node 120b and other end nodes (not shown) are collectively referenced hereinafter as end nodes 120. End nodes 120 are connected to access network 110a via wireless links, each indicated by a broken segmented line. Access network 110a includes network access server 125a and network access server 125b, among others (not shown), collectively referenced hereinafter as network access servers 125. Provider network 110b includes an AAA server 114 and a billing server 115, among other servers (not shown). A content server 170 is included in Internet 110c.

In the illustrated embodiment, access network 110a is a radio access network (RAN) such as a cellular telephone network; and end nodes 120 are wireless devices, such as cellular telephones or wireless network access cards in a portable computing device, such as a laptop computer or personal digital assistant (PDA). In this embodiment, end nodes are mobile nodes that can access the access network at multiple access points (not shown). In such embodiments, it is common for the access network 110a to include multiple network access servers 125, that direct data packets intended for a particular end node to the correct access point in access network 10a. For example, in an access network 110a using the General Packet Radio Service (GPRS) protocol, a network access server 125 is called a Serving GPRS Support Node (SGSN). In an access network 110a using the Code Division Multiple Access (CDMA) protocol, a network access server 125 is given a different name. These and other protocols used in mobile networks are described in specifications of the 3rd Generation Partnership Project (3GPP) available in the specs directory of the 3gpp.org domain of the World Wide Web and in the specs subdirectory of the Public_html directory of the 3gpp2.org domain.

The network access gateway 130 is an intermediate network node through which traffic from access network 110a connects to the Internet 110c. In an access network 110a using GPRS, a network access gateway 130 is called a Gateway GPRS Support Node (GGSN). In some embodiments with an access network 110a using CDMA, a network access gateway 130 is called a packet Data Serving Node (PDSN). In some embodiments with an access network 110a using CDMA, a network access gateway 130 is called a home agent (HA). In some embodiments with an access network 110a using World Interoperability for Microwave Access (WiMAX), based on the Institute of Electrical and Electronics Engineers (IEEE) 802.16 standard, a network access gateway 130 is called Access Service Network Gateway (AS-NGW). HA is part of the larger Mobile IP standards described in Internet Engineering Task force (IETF) Request for Comments (RFC) 3344 and updates in IETF RFC 4721. RFC 3344 is described in file rfc3344.txt and RFC 4721 is described in file rfc4721.txt. These and other RFC files are available in directory rfc at domain ietf.org of the World Wide Web.

In other embodiments, access network 110a is a different type of network, such as a cable access network, or a telephone network used for dial-in service.

In some embodiments, the network access gateway 130 is connected directly to provider network 110b or Internet 110c, or both. In some embodiments, the network access gateway 130 is connected to the provider network 110b, or Internet 110c, or both, through one or more other intermediate network nodes, such as a node acting as a firewall to divert hostile traffic. In the illustrated embodiment, the network access gateway 130 is connected to the provider network 110b and the Internet 110c through a content gateway 140.

The content gateway 140 is a type of service gateway that is sensitive to the content of data packets transmitted through it; and is able to differentiate different types of data packets, such as web pages, email, file transfer protocol, instant messages, real-time audio streams and real-time video streams. For example, in some embodiments, the content gateway is a content services gateway (CSG) available from CISCO SYSTEMS, INC.™ of San Jose, Calif. CSG is described in "Subscriber Control and Billing with the Cisco Content Services Gateway," Cisco Systems, Inc., San Jose, Calif., 2003, 15 pp, available in file iscon_wp.pdf at domain www.cisco.com in directory /warp/public/cc/pd/witc/csvcgtwy/prodlit/.

The Internet 110c includes subnets of multiple service providers and multiple servers for various contents, including content server 170.

The provider network 110b, includes servers used only for subscribers of the service provider for access network 110a. Various content servers (not shown) are included in provider network 110b, including email servers, instant message servers, and service subscription servers. Depicted in provider network is Authentication, Authorization, and Accounting (AAA) server 114 and billing server 115, both well known in the art.

Subscribers of the ISP that provides access network 110a and provider network 110b obtain access to Internet 110c through a network access gateway 130. The network access gateway 130 determines whether an entity attempting access is in fact a subscriber authorized to access the network by exchanging packets with the AAA server 114. Example well-known AAA servers include the Remote Authentication Dial In User Service (RADIUS) server, Terminal Access Controller Access Control System (TACACS), and the DIAMETER server. Once the entity is authenticated to be an authorized subscriber, then access is granted to the provider network 110b and the Internet 110c. The end node 120 used by the subscriber is assigned a network layer address, such as an Internet Protocol (IP) address, and internetwork-layer payloads are routed based on the internetwork and higher layer header information.

A billing agent process (called hereinafter a billing agent), typically executing on the network access gateway 130, meters the transactions with the subscriber's end node and sends billing messages to the billing server 115. The billing messages include data that indicates both the subscriber and the transaction completed, if any. Based on the billing messages received, the billing server 115 accumulates a bill to send to the subscriber, or decrements an account balance for prepaid subscribers. A well-known example billing agent is described for CISCO SYSTEMS INC™. Content Services Gateway (CSG) functionality described in file csgiccsg.pdf in subdirectory /univercd/cc/td/doc/product/wireless/mobl-wrls/csg/csgr7/csgic71/at domain cisco.com in the World Wide Web. Well-known example billing servers include the Billing Mediation Agent and the Quota Server described in the same file.

A QoS agent, e.g., QoS agent 142 on content gateway 140, accumulates statistics on packets dropped and forwarded to enforce a QoS for a particular subscriber. In some embodiments, the QoS agent is on a different intermediate network node, e.g., on network access gateway 130. A well known example QoS agent is the QoS Enforcement Function, called the Policy Control Enforcement Function (PCEF) within the 3GPP TS23.203 standard.

According to an illustrated embodiment, a QoS-aware billing agent process (called hereinafter a QoS-aware billing agent), e.g. QoS-aware billing agent 150, retrieves QoS statistics stored by QoS agent 142 and sends billing messages to billing server 115 that are based at least in part on one or more of the QoS statistics. In the illustrated embodiment, the QoS-aware billing agent 150 is on content gateway 140. In other embodiments, the QoS-aware billing agent executes on another intermediate network node, e.g., on network access gateway 130. In some embodiments, the QoS agent and the QoS-aware billing agent are on different intermediate network nodes.

Although a particular number of networks 110a, 110b, 110c, end nodes 120, servers 114, 115, 170, access servers 125a, 125b, and gateways 130 and 140 are shown in network 100 for purposes of illustration, in other embodiments, a network includes more or fewer networks, end nodes, servers, and gateways.

Figure 2:
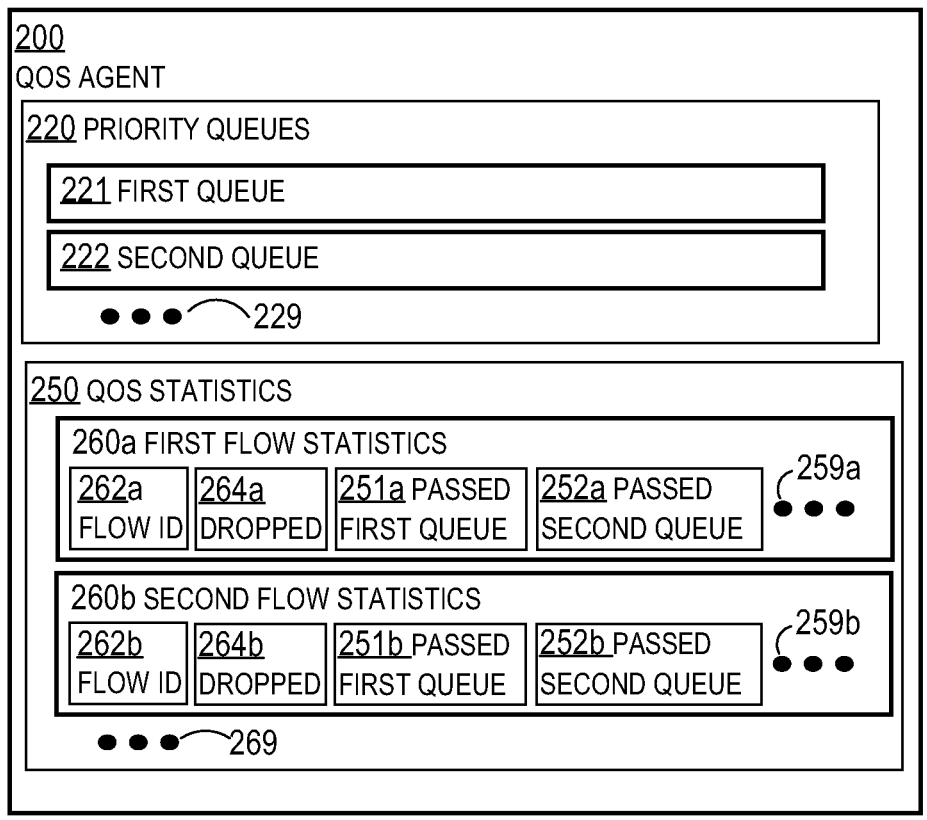
FIG. 2 illustrates an example quality of service agent on an intermediate network node of the network of FIG. 1.

FIG. 2 illustrates an example quality of service agent 200 on an intermediate network node of the network of FIG. 1. QoS agent 200 is a particular embodiment of QoS agent 142 on content gateway 140. The QoS agent 200 is a process that involves, and therefore includes, a priority queues data structure 220 and a QoS statistics structure 250. In the illustrated embodiment, the priority queues data structure 220 includes a first queue 221, a second queue 222, and additional queues indicated by ellipsis 229.

The QoS agent 200, using any method known in the art at the time an embodiment is implemented, identifies a flow of one or more data packets that are communicated between a particular process on a particular subscriber end node (e.g., a client on end node 120a) and a particular remote process (e.g., content server 170) on a different end node. The QoS agent 200, using any method known in the art at the time an embodiment is implemented, determines a quality of service associated with the flow. Based on the quality of service associated with the flow, the data packets of the flow are placed in a particular one of multiple queues in priority queues data structure 220. In some embodiments, data packets from all flows of the same priority are placed on the same queue, e.g., all data packets from all high priority flows are placed in the first queue 221. In some embodiments, the priority queue is based on a QoS precedence and a particular code of a Differentiated Services Code Point (DSCP) that is described in RFC 2474.

One or more data packets on a higher priority queue are forwarded before one or more data packets in a lower priority queue, depending on the implementation of a QoS agent. For example, in some embodiments, all data packets on the higher priority queue (e.g., first queue 221) are forwarded before any data packets in a lower priority queue (e.g., second queue 222). In some embodiments, after forwarding a certain number of bytes from the higher priority queue (e.g., first queue 221), a lesser number of bytes are forwarded from a lower priority queue (e.g., second queue 222). Data packets that arrive for a queue that is full are dropped.

In the illustrated embodiment, the QoS statistics data structure 220 includes a first flow statistics record 260a, a second flow statistics record 260b, and additional flow statistics records indicated by ellipsis 269, collectively referenced hereinafter as flow statistics records 260. Each flow statistics record 260 includes several fields. In the illustrated embodiment, the flow statistics records include flow identifier (ID) field 262a, and flow ID field 262b, and others (collectively referenced hereinafter as flow ID fields 262), in record 260a, record 260b, and other records indicated by ellipsis 269, respectively. The flow ID field 262 holds data that indicates the flow or subscriber that is forwarded by the QoS agent 200. For example, the flow ID field holds data that indicates an IP address of the subscriber end node (e.g., end node 120a) and the IP address and Transmission Control Protocol (TCP) port of the remote process (e.g., content server 170).

In the illustrated embodiment, the flow statistics records include bytes dropped field 264a, and bytes dropped field 264b, and others (collectively referenced hereinafter as bytes dropped field 264), in record 260a, record 260b, and other records indicated by ellipsis 269, respectively. The bytes dropped field 264 holds data that indicates how many bytes were dropped since the flow started for the flow indicated by data in the flow ID field 262 of the same record.

In the illustrated embodiment, the flow statistics records include bytes passed in first queue field 251a, and bytes passed in first queue field 251b, and others (collectively referenced hereinafter as bytes passed in first queue field 251), in record 260a, record 260b, and other records indicated by ellipsis 269, respectively. In the illustrated embodiment, the flow statistics records also include bytes passed in second queue field 252a, and bytes passed in second queue field 252b, and others (collectively referenced hereinafter as bytes passed in second queue field 252), in record 260a, record 260b, and other records indicated by ellipsis 269, respectively. Similarly, the flow statistics records include bytes passed in other queues indicated by ellipsis 259a, ellipsis 259b, and others in record 260a, record 260b, and other records indicated by ellipsis 269, respectively. The bytes passed in first queue field 251 holds data that indicates how many bytes were successfully added to and forwarded from the first queue 221 since the flow started for the flow indicated by data in the flow ID field 262 of the same record. Similarly, the bytes passed in second queue field 252 (and others indicated by ellipsis 259) hold data that indicates how many bytes were successfully added to and forwarded from the second queue 222 (and others indicated by ellipsis 229) since the flow started for the flow indicated by data in the flow ID field 262 of the same record.

QoS statistics are already associated with particular flows. The QoS policy is either configured or sent by a policy server such as the PCRF in 3GPP TS23.203. The policy is associated with a flow mask that uniquely identifies a flow. A modified QoS statistics data structures, e.g., data structure 250 depicted in FIG. 2, holds this information and a modified QoS agent, e.g., agent 200 depicted in FIG. 2, produces these stats.

Although fields and data structures are shown in FIG. 2 as contiguous portions of memory or storage in a particular order for purposes of illustration, in other embodiments one or more fields or data structures or portions thereof are stored in one or more different portions of storage or memory on one or more nodes in the same or different order.

3.0 Method for QoS-aware Billing Agent

Figure 3:
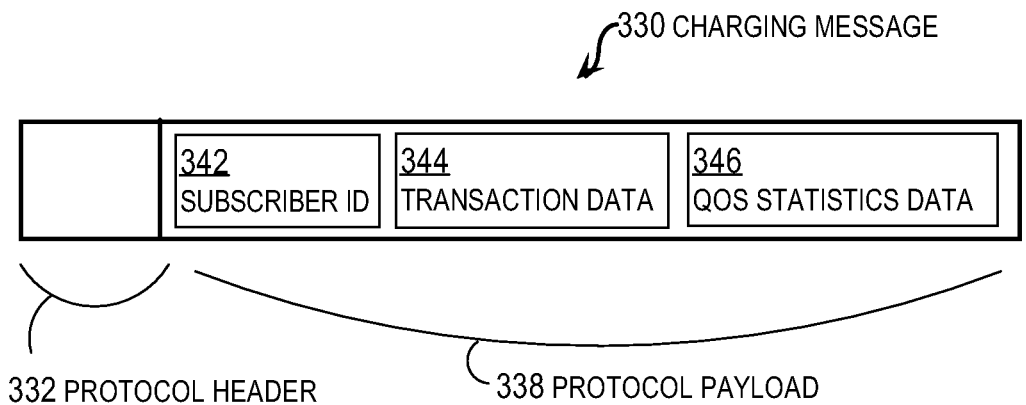
FIG. 3 illustrates an example charging message sent to a billing server.

According to an illustrated embodiment, QoS-aware billing agent 150 includes data based on QoS statistics data structure 250 in a charging message sent to billing server 115. FIG. 3 illustrates an example charging message 330 sent to a billing server.

In some embodiments charging message 330 is a call detail record (CDR) for a voice call; in some embodiments the charging message 330 is a charging data record (CDR) for future billings on an active account for a variety of subscribed services on a packet-switched network. In some embodiments, the charging message is a prepaid charging record (PCR) sent to a billing server 115 for a prepaid account for a variety of subscribed services.

Charging message 330 includes a protocol header 332 and protocol payload 338 for a network protocol, such as IP. In the protocol payload is a subscriber ID field 342, a transaction data field 344 and a QoS statistics data field 346. The subscriber ID field 342 holds data that indicates a particular subscriber. The subscriber for a transaction is known by the intermediate network node that queried the AAA server 114 to authenticate the user of a particular end node. As a result, an end node IP address is associated with the subscriber ID on that node, as is well known in the art. In some embodiments, the subscriber ID field includes the IP address of the end node in addition to or instead of the subscriber ID. The transaction data field 344 holds data that indicates a particular transaction completed by the subscriber on the network, e.g., on network 100. For example, in some embodiments, the transaction data indicates a number of bytes or files downloaded from a ring tones directory or a music file directory. Field 342 and field 344 are found in prior art charging messages.

According to the illustrated embodiment, the charging message 330 also includes QoS statistics data field 346. The QoS statistics data field 346 holds data that is based on one or more fields in the QoS statistics data structure 250 associated with the flow that is involved with the transaction indicated in the transaction data field 344. In some embodiments, the data in the QoS statistics data field 346 includes one or more fields from the QoS statistics data structure 250. In some embodiments, QoS statistics data 346 holds data that indicates a money debit or credit computed based on one or more fields in the QoS statistics data structure 250. For example, if more data is passed in a higher priority queue as indicated by the data in field 251 than a subscriber has contracted for, then the data in the QoS statistics data field 346 indicates an additional charge (a surcharge) for the above-contract delivery of data. Similarly, in some embodiments, if more data is dropped, as indicated by the data in field 264, than is permitted under a quality of service that a subscriber has contracted for, then the data in the QoS statistics data field 346 indicates an credit for the below-contract delivery of data. In some embodiments, the QoS statistics data field 346 holds other data that is derived from one or more fields in the QoS statistics data structure 250.

Although fields are shown in FIG. 3 as contiguous portions of a data packet in a particular order for purposes of illustration, in other embodiments one or more fields or portions thereof occur in a different order in the data packet.

Figure 4:
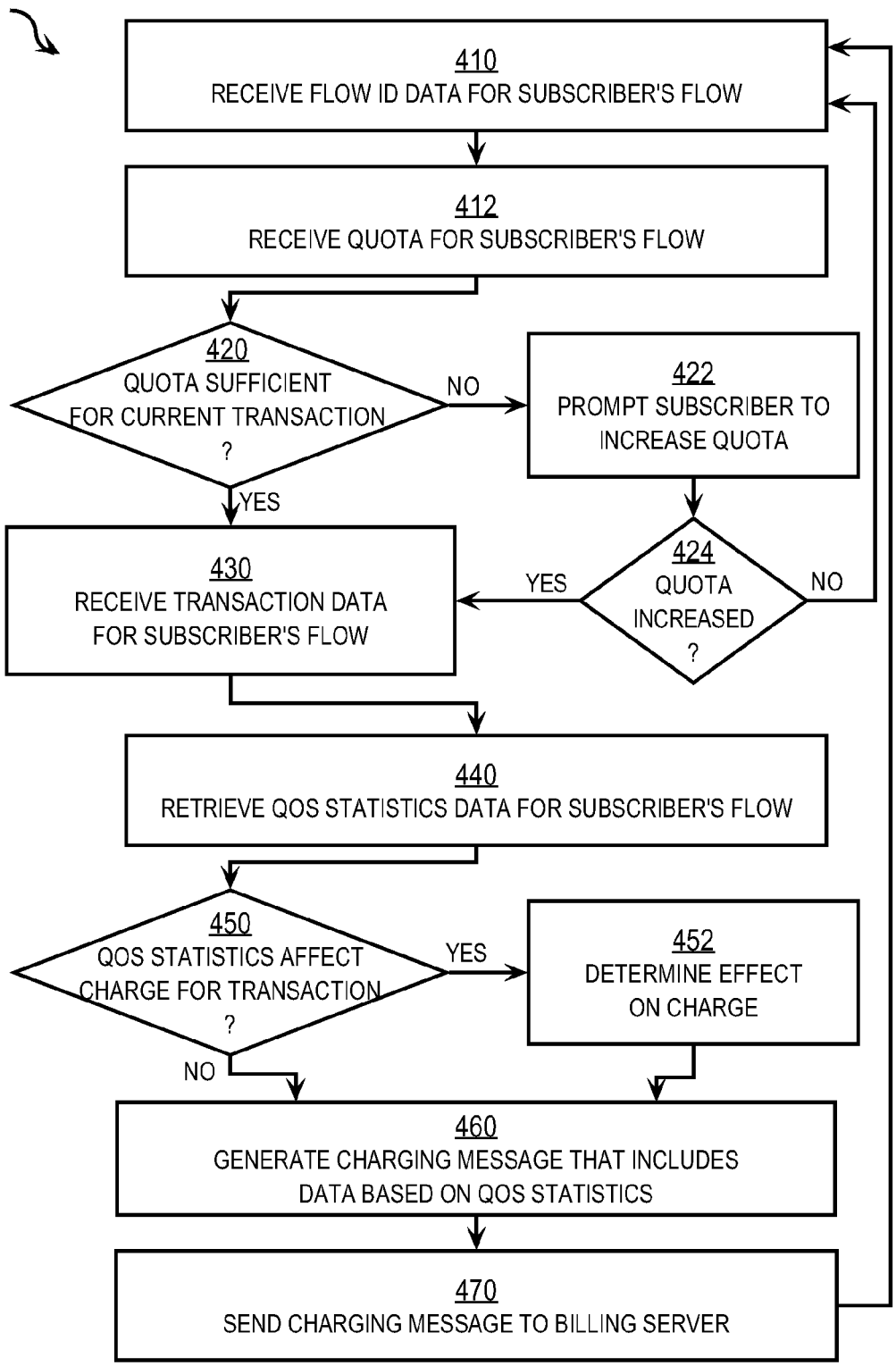
FIG. 4 illustrates at a high level, an example method at a billing agent on an intermediate network node of the network of FIG. 1.

FIG. 4 illustrates at a high level, an example method 400 at a billing agent on an intermediate network node of the network 100 of FIG. 1. In the illustrated embodiment, method 400 is performed by QoS-aware billing agent 150 on content gateway 140. Although steps in FIG. 4 are show in a particular order for purposes of illustration, in other embodiments, one or more steps may be performed in a different order or overlapping in time, in series or in parallel, or one or more steps may be omitted or added, or changed in some combination of ways.

In step 410, flow ID data for a subscriber's flow is received. Any method may be used to receive this data. For example, in various embodiments, the data is included as a default value in software instructions, is received as manual input from a network administrator on the local or a remote node, is retrieved from a local file or database, or is sent from a different node on the network, either in response to a query or unsolicited, or the data is received using some combination of these methods. It is well known in the art how to define a flow ID based on a data packet received at an intermediate network node.

In an illustrated embodiment, the flow ID data indicates an IP address of an end node (e.g., end node 120a) on which the subscriber has logged on, as determined from an exchange with AAA server 114. Thus the data indicates a subscriber ID and an associated IP address of end node 120a. A flow is then identified as a combination of the subscriber's ID or IP address, or both, along with an IP address of a host for a remote process. In many embodiments, the flow ID includes a process identifier, such as a TCP port, for the process (e.g., a hypertext markup-language, HTML, client) on the subscribers end node (e.g., 120a) and a process identifier, such as a TCP port, for the process (e.g., a HTML server as content server 170) on the remote end node. Thus a data packet sent from an HTML client on end node 120a is received at content gateway 140 and used to define a flow ID. The flow ID is passed to QoS-aware billing agent and received in step 410.

In step 412, quota data is received for the subscriber's flow. For example, a message is sent to the billing server 115 that indicates a subscriber ID for the particular subscriber and the type of transaction indicated by the data flow, e.g., a request for a Web page. In response, a message is received indicating a quota of web page retrievals the subscriber may obtain for funds remaining in the prepaid account.

In step 420, it is determined whether the quota is sufficient to complete the current transaction. If so, control passes to step 430 to perform the transaction. If not, control passes to step 422. In step 422 the subscriber is prompted to increase the quota, e.g., by allocating more funds to the prepaid account. Step 422 is performed in any manner known in the art at the time method 400 is implemented. For example, the content gateway 140 sends an HTML message to the subscriber's end node identifier by the IP address (e.g., end node 120a) that causes a prompt to appear on a display of the end node 120a.

In step 424, it is determined whether the quota has been increased sufficiently to allow the transaction to proceed. Any method may be used to make this determination. For example, a script is executed on the end node to detect a subscriber response. An affirmative response includes a response, such as a credit card payment, that causes more money to be allocated to the prepaid account, and a new quota to be received at the billing agent 150 that is sufficient to proceed with the transaction.

If it is determined in step 424 that the quota has not been increased sufficiently to allow the transaction to proceed, then control passes back to step 410 to await the next flow ID data to be received. If it is determined in step 424 that the quota has been increased sufficiently to allow the transaction to proceed, then control passes to step 430.

In some embodiments, in which the subscriber does not have a prepaid account, step 412, step 420, step 422 and step 424 are omitted; and control passes directly from step 410 to step 430.

In step 430, the transaction proceeds; and transaction data is received for that flow. For example, data is received about the file, file size and directory from which a file is downloaded to the subscriber's end node. Such transaction data is currently received by billing agents, and any manner known at the time method 400 is implemented may be used to receive this transaction data. Control then passes to step 440.

In step 440, the billing agent receives QoS statistics data for the subscriber's flow. Any method may be used to receive this data. In an illustrated embodiment, the billing agent 150 retrieves the data from one or more fields of the QoS statistics data structure 250 of QoS agent 142. Control then passes to step 450.

In step 450, it is determined whether the QoS statistics affect charges for the transaction. If so, then control passes to step 452. In step 452, the effect on the charge for the transaction is determined; and control passes to step 460. In step 460, the charge effect is inserted into the QoS statistics data field 346 in a charging message 330.

If it is determined, in step 450, that the QoS statistics do not affect charges for the transaction, control passes to step 460.

In step 460, data indicating no QoS charge effect is inserted into the QoS statistics data field 346 in a charging message 330.

In some embodiments, in which a billing server determines the cost effect of any QoS statistic, step 450 and step 452 are omitted; and control passes directly from step 440 to step 460. In step 460 one or more of the retrieved QoS statistics, or data derived therefrom, is inserted into the QoS statistics data field 346 of the charging message 330.

In step 470, the charging message 330 is sent to the billing server 115. In response, the billing server 115 computes a charge for the subscriber, or decrements a subscriber's prepaid account, based at least in part on the data in the QoS statistics data field 346.

4.0 Implementation Mechanisms-Hardware Overview

Figure 5:
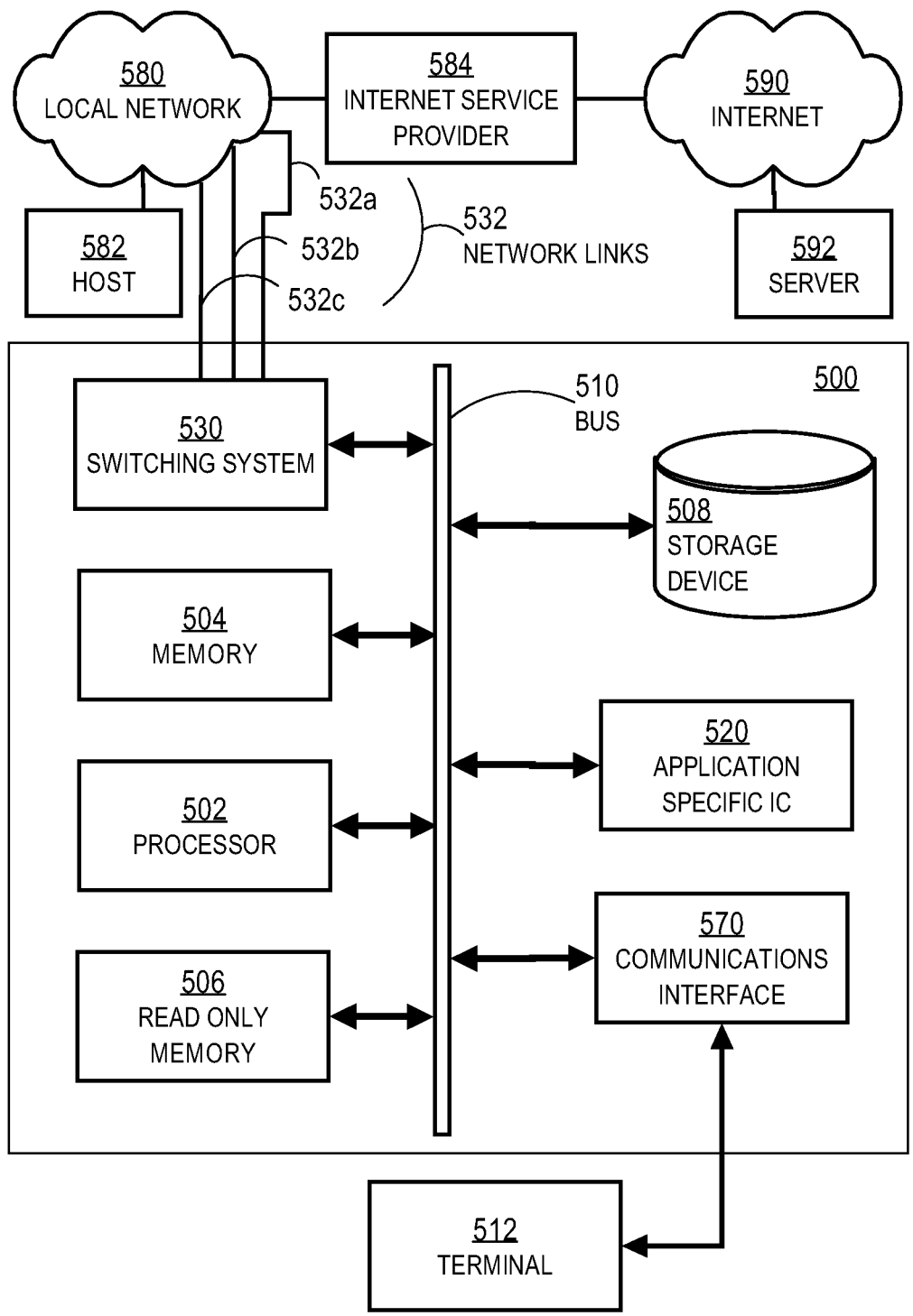
FIG. 5 illustrates a computer system upon which an embodiment of the invention may be implemented.

FIG. 5 illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a communication mechanism such as a bus 510 for passing information between other internal and external components of the computer system 500. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 510 includes many parallel conductors of information so that information is transferred quickly among devices coupled to the bus 510. One or more processors 502 for processing information are coupled with the bus 510. A processor 502 performs a set of operations on information. The set of operations include bringing information in from the bus 510 and placing information on the bus 510. The set of operations also typically include comparing two or more units of information, shifting positions of units of information, and combining two or more units of information, such as by addition or multiplication. A sequence of operations to be executed by the processor 502 constitute computer instructions.

Computer system 500 also includes a memory 504 coupled to bus 510. The memory 504, such as a random access memory (RAM) or other dynamic storage device, stores information including computer instructions. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of computer instructions. The computer system 500 also includes a read only memory (ROM) 506 or other static storage device coupled to the bus 510 for storing static information, including instructions, that is not changed by the computer system 500. Also coupled to bus 510 is a non-volatile (persistent) storage device 508, such as a magnetic disk or optical disk, for storing information, including instructions, that persists even when the computer system 500 is turned off or otherwise loses power.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 510 for use by the processor from an external terminal 512, such as a terminal with a keyboard containing alphanumeric keys operated by a human user, or a sensor. A sensor detects conditions in its vicinity and transforms those detections into signals compatible with the signals used to represent information in computer system 500. Other external components of terminal 512 coupled to bus 510, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 512. In some embodiments, terminal 512 is omitted.

Computer system 500 also includes one or more instances of a communications interface 570 coupled to bus 510. Communication interface 570 provides a two-way communication coupling to a variety of external devices that operate with their own processors, such as printers, scanners, external disks, and terminal 512. Firmware or software running in the computer system 500 provides a terminal interface or character-based command interface so that external commands can be given to the computer system. For example, communication interface 570 may be a parallel port or a serial port such as an RS-232 or RS-422 interface, or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 520, is coupled to bus 510. The special purpose hardware is configured to perform operations not performed by processor 502 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware. Logic encoded in one or more tangible media includes one or both of computer instructions and special purpose hardware.

In the illustrated computer used as a router, the computer system 500 includes switching system 530 as special purpose hardware for switching information for flow over a network. Switching system 530 typically includes multiple communications interfaces, such as communications interface 570, for coupling to multiple other devices. In general, each coupling is with a network link 532 that is connected to another device in or attached to a network, such as local network 580 in the illustrated embodiment, to which a variety of external devices with their own processors are connected. In some embodiments an input interface or an output interface or both are linked to each of one or more external network elements. Although three network links 532a, 532b, 532c are included in network links 532 in the illustrated embodiment, in other embodiments, more or fewer links are connected to switching system 530. Network links 532 typically provides information communication through one or more networks to other devices that use or process the information. For example, network link 532b may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server 592 connected to the Internet provides a service in response to information received over the Internet. For example, server 592 provides routing information for use with switching system 530.

The switching system 530 includes logic and circuitry configured to perform switching functions associated with passing information among elements of network 580, including passing information received along one network link, e.g. 532a, as output on the same or different network link, e.g., 532c. The switching system 530 switches information traffic arriving on an input interface to an output interface according to pre-determined protocols and conventions that are well known. In some embodiments, switching system 530 includes its own processor and memory to perform some of the switching functions in software. In some embodiments, switching system 530 relies on processor 502, memory 504, ROM 506, storage 508, or some combination, to perform one or more switching functions in software. For example, switching system 530, in cooperation with processor 504 implementing a particular protocol, can determine a destination of a packet of data arriving on input interface on link 532a and send it to the correct destination using output interface on link 532c. The destinations may include host 582, server 592, other terminal devices connected to local network 580 or Internet 590, or other routing and switching devices in local network 580 or Internet 590.

The invention is related to the use of computer system 500 for implementing the techniques described herein. According to one embodiment of the invention, those techniques are performed by computer system 500 in response to processor 502 executing one or more sequences of one or more instructions contained in memory 504. Such instructions, also called software and program code, may be read into memory 504 from another computer-readable medium such as storage device 508. Execution of the sequences of instructions contained in memory 504 causes processor 502 to perform the method steps described herein. In alternative embodiments, hardware, such as application specific integrated circuit 520 and circuits in switching system 530, may be used in place of or in combination with software to implement the invention. Thus, embodiments of the invention are not limited to any specific combination of hardware and software.

The signals transmitted over network link 532 and other networks through communications interfaces such as interface 570, which carry information to and from computer system 500, are example forms of carrier waves. Computer system 500 can send and receive information, including program code, through the networks 580, 590 among others, through network links 532 and communications interfaces such as interface 570. In an example using the Internet 590, a server 592 transmits program code for a particular application, requested by a message sent from computer 500, through Internet 590, ISP equipment 584, local network 580 and network link 532*b* through communications interface in switching system 530. The received code may be executed by processor 502 or switching system 530 as it is received, or may be stored in storage device 508 or other non-volatile storage for later execution, or both. In this manner, computer system 500 may obtain application program code in the form of a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to an infra-red signal, a carrier wave serving as the network link 532*b*. An infrared detector serving as communications interface in switching system 530 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502 or switching system 530.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising:
   receiving an attempt from an entity to access a network;
   exchanging a packet with a server to determine an IP address for the entity;
   identifying a flow based on the IP address;
   placing the data packet into one of a plurality of queues, based on a particular code of a Differentiated Services Code Point (DSCP);
   receiving, at an intermediate network node, statistics data indicating a first amount of data from the flow forwarded at a contracted quality of service level in a first queue of the plurality of queues, and a second amount of data from the flow forwarded at a delivered quality of service level in a second queue of the plurality of queues, the first queue having a higher priority than the second queue;
   determining a credit for the flow based on a difference between the contracted quality of service level and the delivered quality of service level;
   inserting credit data indicating the credit into a data field in a charging message; and
   sending the charging message to a billing server, the charging message including the IP address and the credit data.

2. A method as recited in claim 1, wherein the charging message includes the statistics data, the contracted quality of service level indicates a maximum for data degradation, and the billing server is configured to credit a subscriber an amount based on the charging message.

3. A method as recited in claim 2, wherein said maximum for data degradation is defined by one or more of a maximum for data lost, a maximum for delay time, and a maximum for jitter.

4. A method as recited in claim 1, wherein the statistics data comprises an amount of data packets dropped from the flow, and the credit is determined based on the amount of data packets dropped.

5. A method as recited in claim 1, wherein:
   said statistics data comprises an amount of dropped data that should have been delivered according to the contracted quality of service level; and
   the credit data indicates a refund amount for a subscriber based on the amount of dropped data.

6. A method as recited in claim 1, wherein the statistics data comprises a rate at which the flow was transmitted through the intermediate network node.

7. A method as recited in claim 1, further comprising:
   sending a message indicating a charge effect; and
   receiving data that indicates a confirmation of the charge effect, before continuing with forwarding the flow.

8. An apparatus, comprising:
   a communications interface that receives an attempt from an entity to access a network, exchanges a packet with a server to determine an IP address for the entity, and receives statistics data indicating a first amount of data from a flow forwarded at a contracted quality of service level in a first queue, and a second amount of data from the flow forwarded at a delivered quality of service level in a second queue, the first queue having a higher priority than the second queue; and
   means for identifying the flow based on the IP address, for placing a data packet into the first queue or the second queue, based on a particular code of a Differentiated Services Code Point (DSCP), for determining a credit for the flow based on a difference between the contracted quality of service level and the delivered quality of service level, and for inserting credit data indicating the credit into a data field in a charging message, wherein the communications interface sends the charging message to a billing server, the charging message including the IP address and the credit data.

9. An apparatus as recited in claim 8, wherein the means for determining inserts data indicating no charge effect into the charging message in response to a determination that the statistics data does not affect charges.

10. An apparatus as recited in claim 8, wherein the statistics data is produced by a content gateway.

11. An apparatus as recited in claim 8, wherein the apparatus is a proxy for the billing server.

12. An apparatus as recited in claim 8, wherein the charging message is a charging data record.

13. An apparatus as recited in claim 8, wherein the charging message is a prepaid charging record.

14. An apparatus, comprising:
    a network interface that is configured to receive an attempt from an entity to access a network and to exchange a packet with a server to determine an IP address for the entity; and
    logic encoded in one or more tangible media for execution and, when executed, operable to
        identify a flow based on an IP address of a host;
        place the data packet into one of a plurality of queues, based on a particular code of a Differentiated Services Code Point (DSCP);
        receive statistics data indicating a first amount of data from the flow forwarded at a contracted quality of service level in a first queue of the plurality of queues, and a second amount of data from the flow forwarded at a delivered quality of service level in a second queue of the plurality of queues, the first queue having a higher priority than the second queue;
        determine a credit for the flow based on a difference between the contracted quality of service level and the delivered quality of service level;
        insert credit data indicating the credit into a data field in a charging message; and
        send the charging message to a billing server, the charging message including the IP address for the entity and the credit data.

15. An apparatus as recited in claim 14, wherein the charging message includes the statistics data, the contracted quality of service level indicates a maximum for data degradation, and the billing server is configured to credit a subscriber an amount based on the charging message.

16. An apparatus as recited in claim 15, wherein:
    said statistics data comprises an amount of dropped data that should have been delivered according to the contracted quality of service level; and
    the credit data indicates a refund amount for a subscriber based on the amount of dropped data.

17. An apparatus as recited in claim 14, wherein the statistics data comprises an amount of data packets dropped from the flow, and the credit is determined based on the amount of data packets dropped.

18. An apparatus as recited in claim 14, wherein the statistics data comprises a rate at which the flow was transmitted through the apparatus.

19. An apparatus as recited in claim 14, wherein the logic, when executed, is further operable to
    send a message indicating a charge effect; and
    receive data that indicates a confirmation of the charge effect, before continuing with forwarding the flow.

\* \* \* \* \*